Oct. 22, 1940.   L. BRUNNER   2,218,599
PROPULSION MEANS, ESPECIALLY FOR AIRCRAFT
Filed Sept. 5, 1939   3 Sheets-Sheet 1
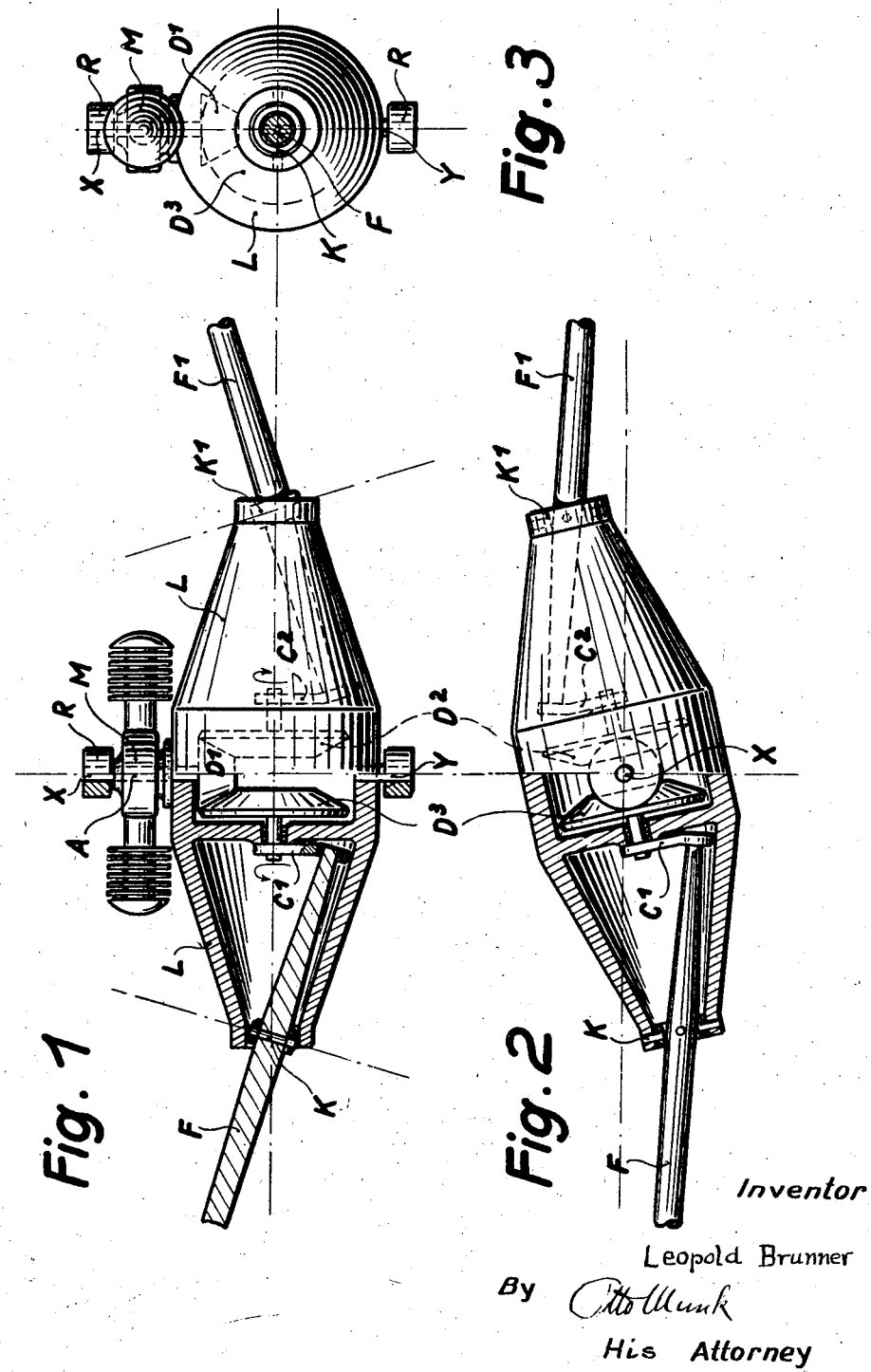
Inventor
Leopold Brunner
By *Otto Munk*
His Attorney

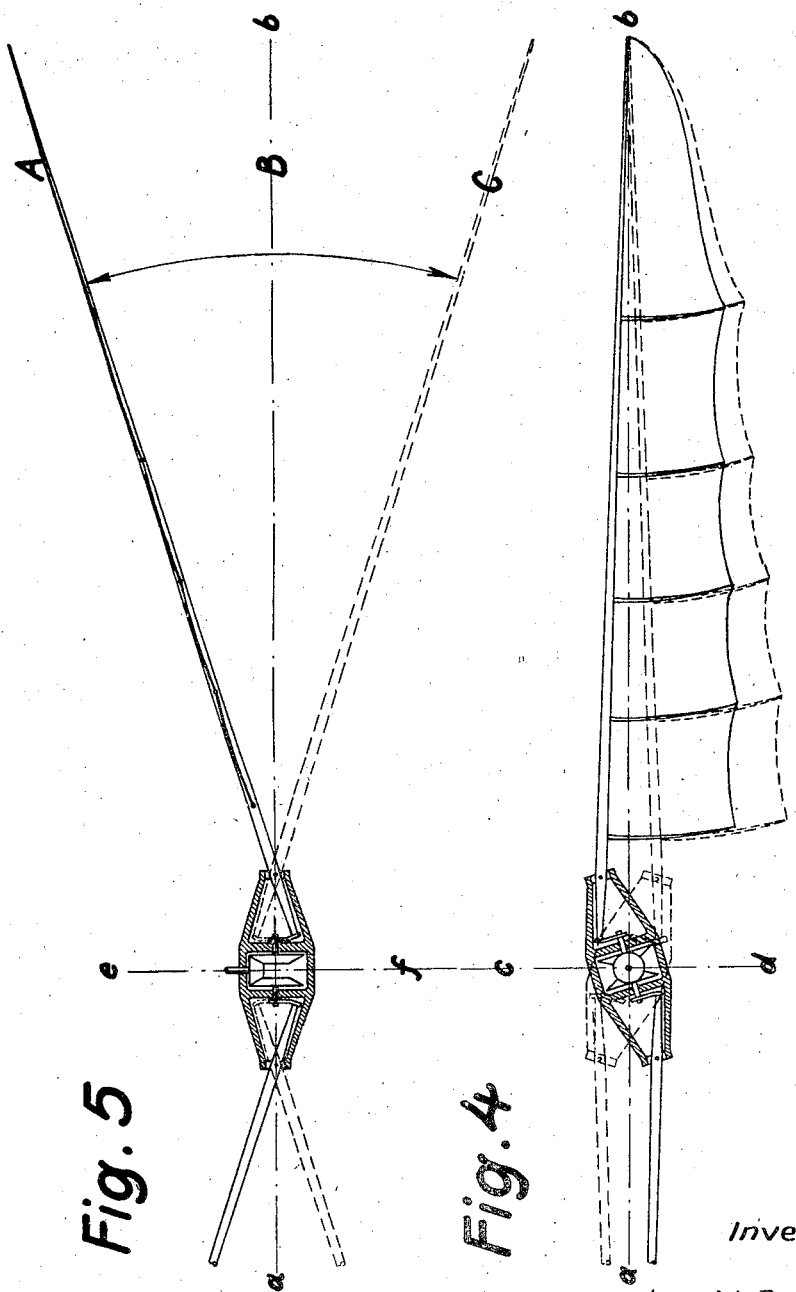

Fig. 6^B
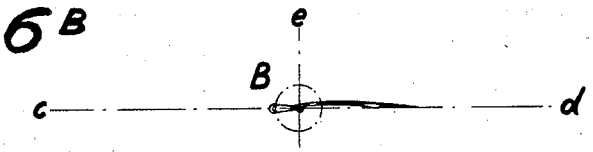
Fig. 6^A
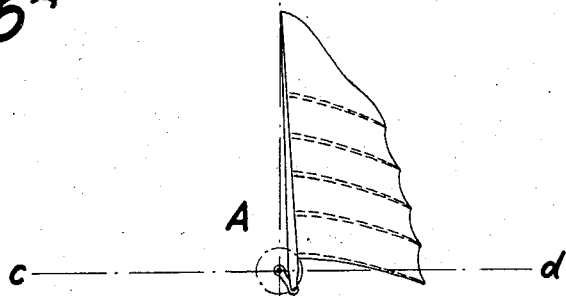
Fig. 6^C
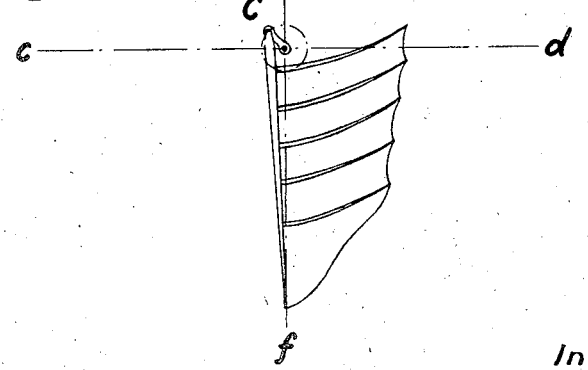
Inventor
Leopold Brunner
By Otto Munk
His Attorney Patented Oct. 22, 1940

2,218,599

UNITED STATES PATENT OFFICE 2,218,599

PROPULSION MEANS, ESPECIALLY FOR AIRCRAFT

Leopold Brunner, Brunswick, Germany

Application September 5, 1939, Serial No. 293,419
In Austria September 28, 1936

8 Claims. (Cl. 244—72)

The invention relates to propulsion means for vehicles, especially for ornithopters and like aircraft.

An object of the invention is to provide propulsion means having vibratory wings which means is such that undesirable reactions are obviated or minimised and vibration of the hull due to repeated reversals of such reactions are also obviated or minimised.

A second object of the invention is to provide propulsion means having vibratory wings which may be operated to simulate closely the operation of the wings of birds.

A third object of the invention is to provide propulsion means which, while having wings that are operated so as to simulate closely the operation of the wings of birds, is nevertheless of simple and robust construction and reduces vibration of the hull to a minimum.

A fourth object of the invention is to provide propulsion means in which articulated wings are driven with a rotary motion which is converted to substantially purely up-and-down motion by superimposing a secondary motion upon said wings, thereby allowing said wings to be driven in a simple manner yet in such a way that their operation closely simulates the operation of the wings of birds.

In the drawings an example of the invention is diagrammatically illustrated. Thus:

Fig. 1 is a front elevation of the means according to the example, parts being in section and the wing shafts being broken away near their inner ends.

Fig. 2 is a plan view corresponding to Fig. 1, parts likewise being in section.

Fig. 3 is a side elevation corresponding to Fig. 1.

Figs. 4 and 5, illustrate in plan and elevation the movements of the wings and their support.

Figs. 6A, 6B, 6C show three positions of a wing in end elevation.

Referring to the drawings.

In Fig. 1 it is to be seen that the driving motor M of the propulsion means is fixed on the transverse wing support L and transmits its power, by way of the drive-receiving shaft A and the small bevel wheel $D_1$, to the two larger bevel wheels $D_2$ and $D_3$. The support and the motor are coaxially arranged and are mounted conjointly in bearings R which allow them to rock freely about their common axis XY to a limited extent. On stub shafts mounting the bevel wheels $D_2$ and $D_3$ there are secured cranks $C_1$ and $C_2$ which, by reason of the bevels $D_2$ and $D_3$ engaging opposite parts of the common driving bevel wheel $D_1$, are rotated in opposite directions. The cranks are mutually set so that they pass simultaneously through the horizontal plane, but in positions angularly spaced by 180°, as shown in Fig. 2.

Shafts F and $F_1$ that carry the wings (not shown in Figs. 1, 2 and 3) are mounted for universal movement on the transverse support L, by virtue of universal couplings K and $K_1$. The shafts are, however, not turnable in said couplings about their own axes, being so fixed that the surfaces of the wings normally remain generally parallel to the direction of motion of the aircraft. The cranks C $C_1$ are applied to said shafts at portions thereof which extend inwardly of said couplings K and $K_1$ so that said portions, as well as the portions outwardly of said couplings, are caused to describe a conical path when the propulsion means is set in operation by starting the motor, and the outer ends of the wings receive circular motion in opposite directions about pivot points represented by the universal couplings. Said conical paths are defined by the cranks and by positions of said couplings.

The wings as stated move in opposite directions; thus, assuming that operation is initiated when the wings are in a position shown in Fig. 1, the one crank in describing its first quarter turn moves forwardly whereas the other crank moves rearwardly. This naturally gives rise to reactions in the couplings K and $K_1$ which act in opposite senses. Such reactions cannot, however, be resisted by the couplings because the support L is free to rock about the axis XY. The reactions thus cause a turning movement to be applied to the support and result in a rocking of the propulsion means as a whole (consisting of the support together with the wings, their shafts and the motor). This rocking, however, occurs only in the horizontal plane because the axis XY is upright or approximately so. Theoretically it continues in one direction so long as the turning moment resulting from the reactions acts in the particular direction, that is to say, until both cranks reach the horizontal plane which is the case after a rotation of 90° from the position shown in Fig. 1.

Upon further rotation of the cranks the reactions are reversed and continue to act thus through an angle of rotation of 180°, that is until the cranks again reach horizontal positions. At the same time, the turning moment acting on the support L also reverses its direction and the support is displaced in the corresponding direction. This reversal in the direction of movement of the support therefore takes place always when both cranks are in the position shown in Fig. 2.

The kinematical system is, hence, contrived in such a way that although the wing shafts F, F₁ describe conical paths with reference to the couplings K, K₁, this conical path undergoes continuously a fore-and-aft movement and this merely under the influence of the reactions arising in the couplings K, K₁. This has the result that the wing shaft portions which extend outwardly of the couplings do not describe a conical path with reference to the propulsion means as a whole but describes an elliptical path which the nearer one approaches to the outer edge of the wings becomes correspondingly flatter. Indeed the outer ends of the wings undergo an almost purely up-and-down movement (positions A, B and C of Figs. 5 and 6) and this movement can be regarded as approximately rectilinear when one considers the length of the wings in relation to their stroke. Strictly speaking, however, the end of a wing describes an arcuate path (when viewed along the direction of travel) which has for its radius the distance between the said end and the corresponding coupling. The plane of the arc is moreover approximately perpendicular to the direction of flight, being defined by the axes $a$—$b$, $e$—$f$ of Fig. 5.

The reaction forces are in this way, by virtue of the wing shafts being bodily movable with the couplings K, K₁ (or in other words by virtue of the support L mounting the coupling themselves for bodily movement) are utilised to convert the rotational drive delivered by the driving motor into such an up-and-down movement of the outer ends of the wings as is most favourable for the aircraft, the operation of the wings simulating closely the operation of the wings of birds. Appropriate dimensioning of the movable parts also allows the whole of the aircraft to be freed from undesirable reactions.

If the movement is considered with reference to a fixed axis, say the axis XY which is fixed with reference to the craft, then the following is the case:

The universal couplings K, K₁ (Figs. 1 and 2) rock about the axis XY, moving in an arc whose diameter is the distance between the couplings and whose centre is the point of intersection of this axis and the plane $a$—$b$, $c$—$d$, Fig. 4. The conical movement of the wing shafts with reference to the pivot points represented by the couplings has therefore, in consequence of the arcuate movement of these couplings (as shown in Fig. 4), no longer a circular basis when considered absolutely but is derived from two semi-circles joined by straight lines, the length of these lines being equal and determined by the extent of the rocking movement of the support L. During such rocking movements the bevel wheels D₂ and D₃ roll upon the wheel D₁ but this is however of no significance. The further the point of the wing shaft whose motion is considered, is removed from K or K₁, the more does its movement lose the character of rotation until at the outer ends it is indeed a to-and-fro movement. It no longer describes, in space, a circle lying in the plane of the direction of flight. It would only do this if the pivot points were not displaceable.

In sum, therefore, the wings vibrate up-and-down through a stroke which is determined by the radius of the cranks and the distance of the cranks from the pivot points. The parts of the wings nearer the pivot points describe also a fore-and-aft movement (with reference to the direction flight) as Fig. 4 shows in plan view and Fig. 6 in said view. It is not difficult to relate the movements to one another in such a way that each wing shaft describes at its outer end an arcuate path in only plane; that which is perpendicular to the direction of flight.

If the wings are short and light, little power is required to move them. In this way, the reactions arising are further reduced and the mechanism is rocked to a lesser extent.

Instead of the motor M a simpler driving means may be employed, for example, where the invention is applied to the propulsion of model aircraft. In such cases, the employment of rubber bands as already employed for the propulsion of model aircraft may suffice.

I claim:

1. Propulsion means for aircraft comprising two opposed lateral wings, couplings mounting said wings each for movement in a conical path about a pivot point, drive receiving mechanism adapted to move said wings in said conical path, the outer ends of the wings receiving circular motion about their respective pivot points, means movably supporting said couplings so that said pivot points can move in a plane substantially perpendicular to the plane of said circular motion, on operation of the wings said pivot points being moved in said plane so as substantially to equilibrate the longitudinal component of said circular motion, thereby converting said circular motion to a motion which is substantially purely up-and-down with reference to the propulsion means as a whole.

2. Propulsion means for aircraft comprising two opposed lateral wings, a support in which said wings are mounted each for universal movement about a pivot point on said support, a drive-receiving element, operative connections between said element and the wings respectively that constrain the distal ends of said wings to circular motion about their respective pivot points, a mounting for the support that allows the support to rock about an upright axis, during operation of the wings the support being rocked about said axis so as substantially to equilibrate, by horizontal movement of said pivot points, the horizontal component of said circular motion, thereby converting said circular motion to a motion which is substantially purely up-and-down with reference to the propulsion means as a whole.

3. Propulsion means for vehicles comprising two opposed lateral wings, couplings that mount said wings each for movement in a conical path about a pivot point towards the inner end of the wing, a shaft-like extension on each wing projecting inwardly of the corresponding pivot point, drive-receiving mechanism applied to the extensions so as to constrain them each to describe a conical path having its apex at the corresponding pivot point whereby the outer ends of the wings receive a circular motion with reference to the respective pivot points, means movably supporting said couplings so that said pivot points can move in a plane substantially perpendicular to the plane of said circular motion, on operation of the wings said pivot points being moved in said plane so as substantially to equilibrate the longitudinal component of said circular motion, thereby converting said circular motion to a motion which is substantially purely up-and-down with reference to the propulsion means as a whole.

4. Propulsion means for aircraft comprising two opposed lateral wings, a support in which said wings are mounted each for universal movement about a pivot point on said support, drive receiving mechanism applied to said wings so as to constrain their distal ends to circular motion in opposite directions about their respective pivot points, a pivotal mounting for said support which allows said support to rock to-and-fro in a longitudinal plane substantially normal to the plane of said circular motion under the influence of the reaction to said circular motion, such rocking movement substantially equilibrating the longitudinal component of said circular motion, thereby converting said circular motion to a motion which is substantially purely up-and-down with reference to the propulsion means as a whole.

5. Propulsion means according to claim 4, wherein said drive receiving mechanism comprises a driving bevel gear common to the wings, a driven bevel gear individual to each wing, the driven bevel gears engaging opposite parts of said driving bevel gear, and operative connections between said driven bevel gears and the respective wings.

6. Propulsion means for aircraft comprising two opposed lateral wings, couplings that mount said wings each for movement in a conical path about a pivot point towards the inner end of the wing, a shaft-like extension on each wing projecting inwardly of the corresponding pivot point, a drive-receiving bevel wheel common to the wings, a driven bevel wheel individual to each wing, the driven wheels engaging opposite parts of said drive-receiving wheel, cranks drivingly connected to said driven wheel and applied to the shaft-like extensions on the respective wings, whereby the outer ends of the wings, receive a circular motion in opposite directions with reference to the respective pivot points, means movably supporting said couplings so that said pivot points can move in a plane substantially perpendicular to the plane of said circular motion, on operation of the wings said pivot points being moved in said plane so as substantially to equilibrate the longitudinal component of said circular motion, thereby converting said circular motion to a motion which is substantially purely up-and-down with reference to the propulsion means as a whole.

7. Propulsion means for aircraft comprising two opposed lateral wings, a support in which said wings are mounted each for universal movement about a pivot point on said support, a drive receiving element, a crank individual to each wing, the cranks being drivingly connected with said element for continuous rotation in opposite directions and applied to said wings inwardly of said pivot points whereby the outer ends of the wings receive a circular motion in opposite directions with reference to the respective pivot points, a mounting for said support which allows said support to rock freely to-and-fro in a plane substantially normal to the plane of said circular motion, the respective cranks being mutually set so that they pass simultaneously through said longitudinal plane in positions spaced by a 180°, whereby a continually reversing turning moment arising from the reaction to said circular motion is applied to said support upon operation the propulsion means, causing said support to rock to-and-fro in said longitudinal plane.

8. Propulsion means for aircraft according to claim 2 and further comprising a motor drivingly connected with said drive-receiving element, the motor being mounted on said support and coaxially with said upright axis.

LEOPOLD BRUNNER.